United States Patent
Moran et al.

(10) Patent No.: US 9,961,204 B1
(45) Date of Patent: May 1, 2018

(54) MONITORING AGENT OVERSIGHT OF ARTIFICIAL INTELLIGENCE CONTENT IN A CONTACT CENTER

(71) Applicant: AVAYA INC., Santa Clara, CA (US)

(72) Inventors: Thomas Moran, Kingston (IE); Gerard Carty, Kilcolgan (IE)

(73) Assignee: Avaya Inc., Santa Clara, CA (US)

( * ) Notice: Subject to any disclaimer, the term of this patent is extended or adjusted under 35 U.S.C. 154(b) by 0 days. days.

(21) Appl. No.: 15/682,115

(22) Filed: Aug. 21, 2017

(51) Int. Cl.
| | |
|---|---|
| H04M 3/00 | (2006.01) |
| H04M 5/00 | (2006.01) |
| H04M 3/51 | (2006.01) |
| H04L 12/58 | (2006.01) |
| G06N 7/00 | (2006.01) |
| G06Q 10/06 | (2012.01) |
| G06Q 30/00 | (2012.01) |
| G06N 5/04 | (2006.01) |

(52) U.S. Cl.
CPC .......... *H04M 3/5175* (2013.01); *G06N 5/043* (2013.01); *G06N 7/00* (2013.01); *G06Q 10/06393* (2013.01); *G06Q 10/06398* (2013.01); *G06Q 30/016* (2013.01); *H04L 51/02* (2013.01); *H04M 3/5133* (2013.01); *H04M 3/5183* (2013.01); *H04M 2203/401* (2013.01)

(58) Field of Classification Search
CPC .... H04M 3/51; H04M 3/5175; H04M 3/2281; H04M 2203/401; H04M 2203/40
USPC .... 379/265.06, 242, 265.05, 265.07, 265.09, 379/265.11, 265.03
See application file for complete search history.

(56) References Cited

U.S. PATENT DOCUMENTS

| | | | |
|---|---|---|---|
| 8,818,926 B2 | 8/2014 | Wallace | |
| 9,369,410 B2 | 6/2016 | Capper et al. | |
| 9,442,565 B2 | 9/2016 | Lohrenz et al. | |
| 2005/0071178 A1* | 3/2005 | Beckstrom | H04M 3/51 |
| | | | 379/88.08 |

(Continued)

FOREIGN PATENT DOCUMENTS

JP 2004-302667 10/2004

OTHER PUBLICATIONS

"Chatbots to Become a Major Part of CX by 2020," Research Live, Dec. 12, 2016, 7 pages [retrieved online from: www.research-live.com/article/news/chatbots-to-become-a-major-part-of-cx-by-2020/id/5016102].

(Continued)

*Primary Examiner* — Thjuan K Addy
(74) *Attorney, Agent, or Firm* — Sheridan Ross P.C.

(57) ABSTRACT

Embodiments provide an oversight mechanism using eye tracking to monitor a human agent's review of artificial intelligence generated contact in a contact center communication session. Content generated by an artificial intelligence engine for each session can be presented to the human agent through a user interface for review by the human agent. While the generated content is being presented, an eye tracking system associated can monitor review of the generated content by the human agent. An indication of the human agent's level of attention to the generated content can be generated based on monitoring the review of the content by the human agent. The indication of the human agent's level of attention can be stored in a set of Key Performance Indicators (KPIs) for the human agent. One or more reports can be provided based on the KPIs.

20 Claims, 4 Drawing Sheets

(56) References Cited

U.S. PATENT DOCUMENTS

2009/0245500 A1 10/2009 Wampler
2014/0122619 A1 5/2014 Duan

OTHER PUBLICATIONS

"Chatbots and Artifical Intelligence: Market Assessment, Application Analysis, and Forecasts, 2022: Consumer Chatbot Applications will Continue to Lead the Market Through 2022 with $744M in Revenue," Research and Markets, Jan. 5, 2017, 6 pages [retrieved online from: www.prnewswire.com/news-releases/chatbots-and-artificial-intelligence-market-assessment-application-analysis-and-forecasts-2022-consumer-chatbot-applications-will-continue-to-lead-the-market-through-2022-with-744m-in-revenue---research-and-markets-300386384.html].

"Global Chatbot market: Large Enterprises Inclined toward Prospect of Chatbot-enabled Business Process Automation, Finds TMR," Transparency Market Research, Dec. 8, 2016, 3 pages [retreived online from: www.transparencymarketresearch.com/pressrelease/chatbot-market.htm].

* cited by examiner

MONITORING AGENT OVERSIGHT OF ARTIFICIAL INTELLIGENCE CONTENT IN A CONTACT CENTER

FIELD OF THE DISCLOSURE

Embodiments of the present disclosure relate generally to methods and systems for managing content in a communication session and more particularly to monitoring of agent oversight of artificial intelligence content provided in a communication session with a contact center.

BACKGROUND

Contact centers or systems provide a point of contact through which customers can access information and/or assistance regarding a product or service provided by an enterprise. For example, a contact center can be accessed through a voice call to a telephone number associated with the enterprise such as a toll-free customer service number. Customers seeking information or assistance such as troubleshooting help with a product or service provided by the enterprise can call such a number and be placed into contact with a customer service agent who can provide such information or assistance. Contact centers can also be accessed through a variety of other communication channels including, but not limited to, email, Short Message Service (SMS) or Multimedia Message Service (MMS) text messages, web page interfaces, Instant Message (IM) or other chat services, etc.

As Artificial Intelligence (AI) technology evolves and improves, communications with contact centers are increasingly being handled by various AI components. For example, a chatbot is a computer program able to conduct a conversation with a human contact, such as a customer contact in a contact center, via a text-based communication such as an email, SMS or MMS text, IM, etc. In many cases, a chatbot or other AI component handles an initial portion of a contact session with a customer to, for example, determine a reason or topic for the contact so that the contact can be properly routed to a human agent to handle the contact. In other cases, the AI components may be able to provide sufficient information or resolution to the customer without involving a human agent. It is expected that contact centers will continue to increase the level of automation using AI components such as chatbots, and it is envisaged that a significant percentage of human agent chat or other communication sessions will incorporate multiple AI-generated content segments that are distributed throughout a session and not just at the initial entry point for the customer. Thus, a chat or other communication session might consist of a blending of human agent-generated content and AI-generated content, depending on the context of the communication session.

As this level of AI involvement increases, it is desirable to also measure the quality of oversight that the human agent will apply to the AI-generated content. If this oversight is too little, there is a danger that the AI content may not be appropriate and will cause customer dissatisfaction. Conversely, if the oversight is too much, the advantages of using AI assistance are greatly diminished, as the human agent is spending too much time double checking every piece of content the AI components deliver. Hence, there is a need for improved methods and systems for managing the AI-generated content provided in a contact center communication session to ensure a proper level of oversight is applied.

BRIEF SUMMARY

Embodiments of the disclosure provide systems and methods for monitoring of agent oversight of artificial intelligence content in a contact center. More specifically, embodiments provide an oversight mechanism using eye tracking to monitor a human agent's review of artificial intelligence generated contact in a contact center communication session. According to one embodiment, monitoring of agent oversight of automatically generated content in a contact center can comprise conducting, by one or more communication modules of the contact center over one or more communication channels, a communication session with each of a plurality of client devices. Each client device can be associated with a customer contact. For example, the communication sessions with the plurality of customer contacts can comprise one or more of a chat session, a Short Message Service (SMS) exchange, an email exchange, or another text-based exchange between the customer contacts and the human agent.

Content can be generated for each communication session by an artificial intelligence engine of the contact center such as a chatbot, for example. The generated content for each session can be provided to an agent device associated with a human agent prior to providing the generated content to any of the client devices. The provided, generated content can be presented to the human agent through a user interface provided by the agent device for review by the human agent.

While the generated content is presented through the user interface provided by the agent device an eye tracking system associated with the agent device, can monitor review of the generated content by the human agent. An indication of the human agent's level of attention to the generated content can be generated based on monitoring the review of the content by the human agent. The indication of the human agent's level of attention can be stored in a set of Key Performance Indicators (KPIs) for the human agent. One or more reports can be provided based on the KPIs.

In some cases, the generated indication of the human agent's level of attention can be relative to a predetermined expected level of attention. Additionally, generating the content for each communication session can further comprise generating a level of confidence for the generated content. In such cases, the predetermined expected level of attention can be based on the generated level of confidence for the generated content. In some cases, an indication of the generated level of confidence for the generated content can be provided through the user interface provided by the agent device and along with the generated content.

Figure 1:
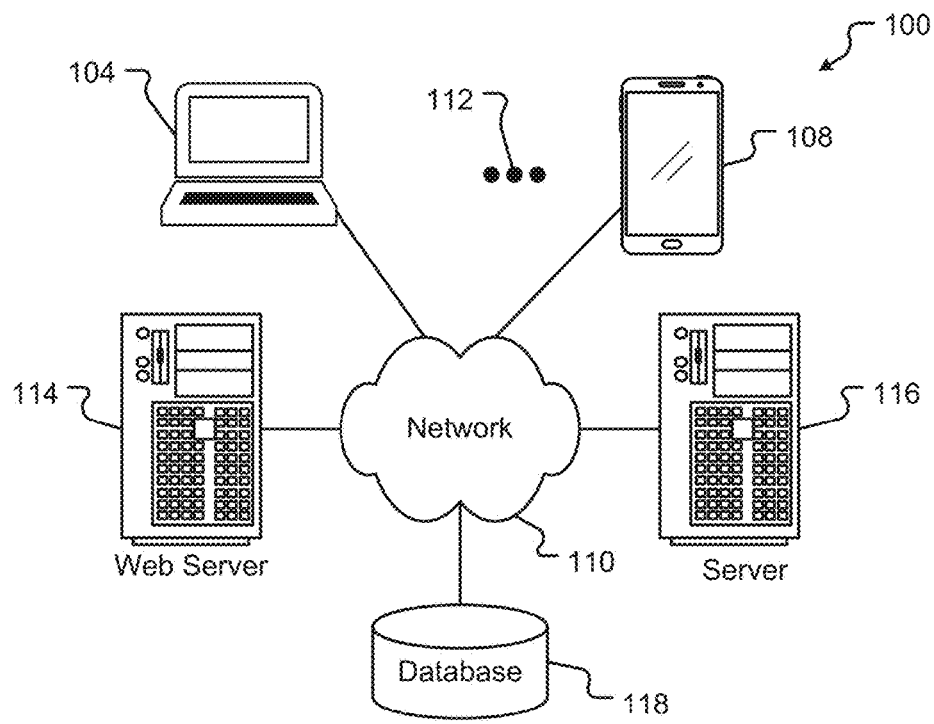
FIG. 1 is a block diagram illustrating elements of an exemplary computing environment in which embodiments of the present disclosure may be implemented.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only, and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Embodiments of the disclosure provide systems and methods for monitoring of agent oversight of artificial intelligence content in a contact center. More specifically, embodiments provide an oversight mechanism using eye tracking to monitor a human agent's review of artificial intelligence generated contact in a contact center communication session. According to one embodiment, monitoring of agent oversight of automatically generated content in a contact center can comprise conducting a communication session such as a chat session, a Short Message Service (SMS) exchange, an email exchange, or another text-based exchange between a plurality of customer contacts and a human agent. Content generated by an artificial intelligence engine for each session can be presented to the human agent through a user interface for review by the human agent. While the generated content is being presented, an eye tracking system associated can monitor review of the generated content by the human agent. An indication of the human agent's level of attention to the generated content can be generated based on monitoring the review of the content by the human agent. The indication of the human agent's level of attention can be stored in a set of Key Performance Indicators (KPIs) for the human agent. One or more reports can be provided based on the KPIs.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

FIG. 1 is a block diagram illustrating elements of an exemplary computing environment in which embodiments of the present disclosure may be implemented. More specifically, this example illustrates a computing environment 100 that may function as the servers, user computers, or other systems provided and described herein. The environment 100 includes one or more user computers, or computing devices, such as a computing device 104, a communication device 108, and/or more 112. The computing devices 104, 108, 112 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 104, 108, 112 may also have any of a variety of applications, including for example, database client and/or server applications, and web browser applications. Alternatively, the computing devices 104, 108, 112 may be any other electronic device, such as a thin-client computer, Internet-enabled mobile telephone, and/or personal digital assistant, capable of communicating via a network 110 and/or displaying and navigating web pages or other types of electronic documents. Although the exemplary computer environment 100 is shown with two computing devices, any number of user computers or computing devices may be supported.

Environment 100 further includes a network 110. The network 110 may can be any type of network familiar to those skilled in the art that can support data communications using any of a variety of commercially-available protocols, including without limitation SIP, TCP/IP, SNA, IPX, AppleTalk, and the like. Merely by way of example, the network 110 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 114, 116. In this example, server 114 is shown as a web server and server 116 is shown as an application server. The web server 114, which may be used to process requests for web pages or other electronic documents from computing devices 104, 108, 112. The web server 114 can be running an operating system including any of those discussed above, as well as any commercially-available server operating systems. The web server 114 can also run a variety of server applications, including SIP (Session Initiation Protocol) servers, HTTP(s) servers, FTP servers, CGI servers, database servers, Java servers, and the like. In some instances, the web server 114 may publish operations available operations as one or more web services.

The environment 100 may also include one or more file and or/application servers 116, which can, in addition to an operating system, include one or more applications accessible by a client running on one or more of the computing devices 104, 108, 112. The server(s) 116 and/or 114 may be one or more general purpose computers capable of executing programs or scripts in response to the computing devices 104, 108, 112. As one example, the server 116, 114 may execute one or more web applications. The web application may be implemented as one or more scripts or programs written in any programming language, such as Java™, C, C#®, or C++, and/or any scripting language, such as Perl, Python, or TCL, as well as combinations of any programming/scripting languages. The application server(s) 116 may also include database servers, including without limitation those commercially available from Oracle®, Microsoft®, Sybase®, IBM® and the like, which can process requests from database clients running on a computing device 104, 108, 112.

The web pages created by the server 114 and/or 116 may be forwarded to a computing device 104, 108, 112 via a web (file) server 114, 116. Similarly, the web server 114 may be able to receive web page requests, web services invocations, and/or input data from a computing device 104, 108, 112 (e.g., a user computer, etc.) and can forward the web page requests and/or input data to the web (application) server 116. In further embodiments, the server 116 may function as a file server. Although for ease of description, FIG. 1 illustrates a separate web server 114 and file/application server 116, those skilled in the art will recognize that the functions described with respect to servers 114, 116 may be performed by a single server and/or a plurality of specialized servers, depending on implementation-specific needs and parameters. The computer systems 104, 108, 112, web (file) server 114 and/or web (application) server 116 may function as the system, devices, or components described herein.

The environment 100 may also include a database 118. The database 118 may reside in a variety of locations. By way of example, database 118 may reside on a storage medium local to (and/or resident in) one or more of the computers 104, 108, 112, 114, 116. Alternatively, it may be remote from any or all of the computers 104, 108, 112, 114, 116, and in communication (e.g., via the network 110) with one or more of these. The database 118 may reside in a storage-area network ("SAN") familiar to those skilled in the art. Similarly, any necessary files for performing the functions attributed to the computers 104, 108, 112, 114, 116 may be stored locally on the respective computer and/or remotely, as appropriate. The database 118 may be a relational database, such as Oracle 20i®, that is adapted to store, update, and retrieve data in response to SQL-formatted commands.

Figure 2:
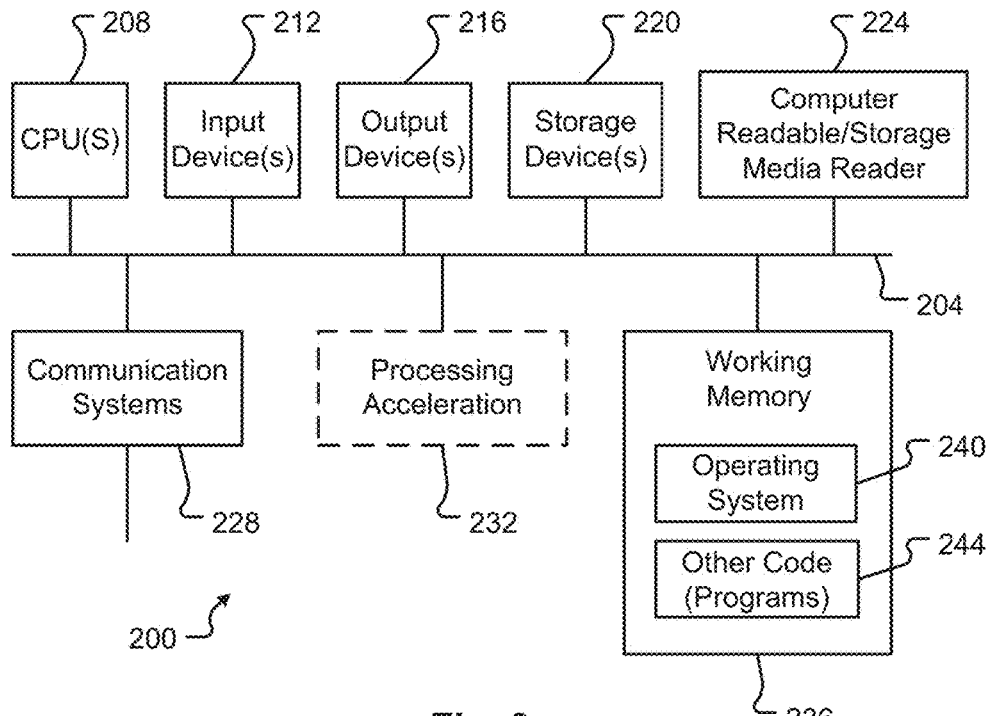
FIG. 2 is a block diagram illustrating elements of an exemplary computing device in which embodiments of the present disclosure may be implemented.

FIG. 2 is a block diagram illustrating elements of an exemplary computing device in which embodiments of the present disclosure may be implemented. More specifically, this example illustrates one embodiment of a computer system 200 upon which the servers, user computers, computing devices, or other systems or components described above may be deployed or executed. The computer system 200 is shown comprising hardware elements that may be electrically coupled via a bus 204. The hardware elements may include one or more central processing units (CPUs) 208; one or more input devices 212 (e.g., a mouse, a keyboard, etc.); and one or more output devices 216 (e.g., a display device, a printer, etc.). The computer system 200 may also include one or more storage devices 220. By way of example, storage device(s) 220 may be disk drives, optical storage devices, solid-state storage devices such as a random-access memory ("RAM") and/or a read-only memory ("ROM"), which can be programmable, flash-updateable and/or the like.

The computer system 200 may additionally include a computer-readable storage media reader 224; a communications system 228 (e.g., a modem, a network card (wireless or wired), an infra-red communication device, etc.); and working memory 236, which may include RAM and ROM devices as described above. The computer system 200 may also include a processing acceleration unit 232, which can include a DSP, a special-purpose processor, and/or the like.

The computer-readable storage media reader 224 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 228 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine-readable mediums for storing information.

The computer system 200 may also comprise software elements, shown as being currently located within a working memory 236, including an operating system 240 and/or other code 244. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 208 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 3:
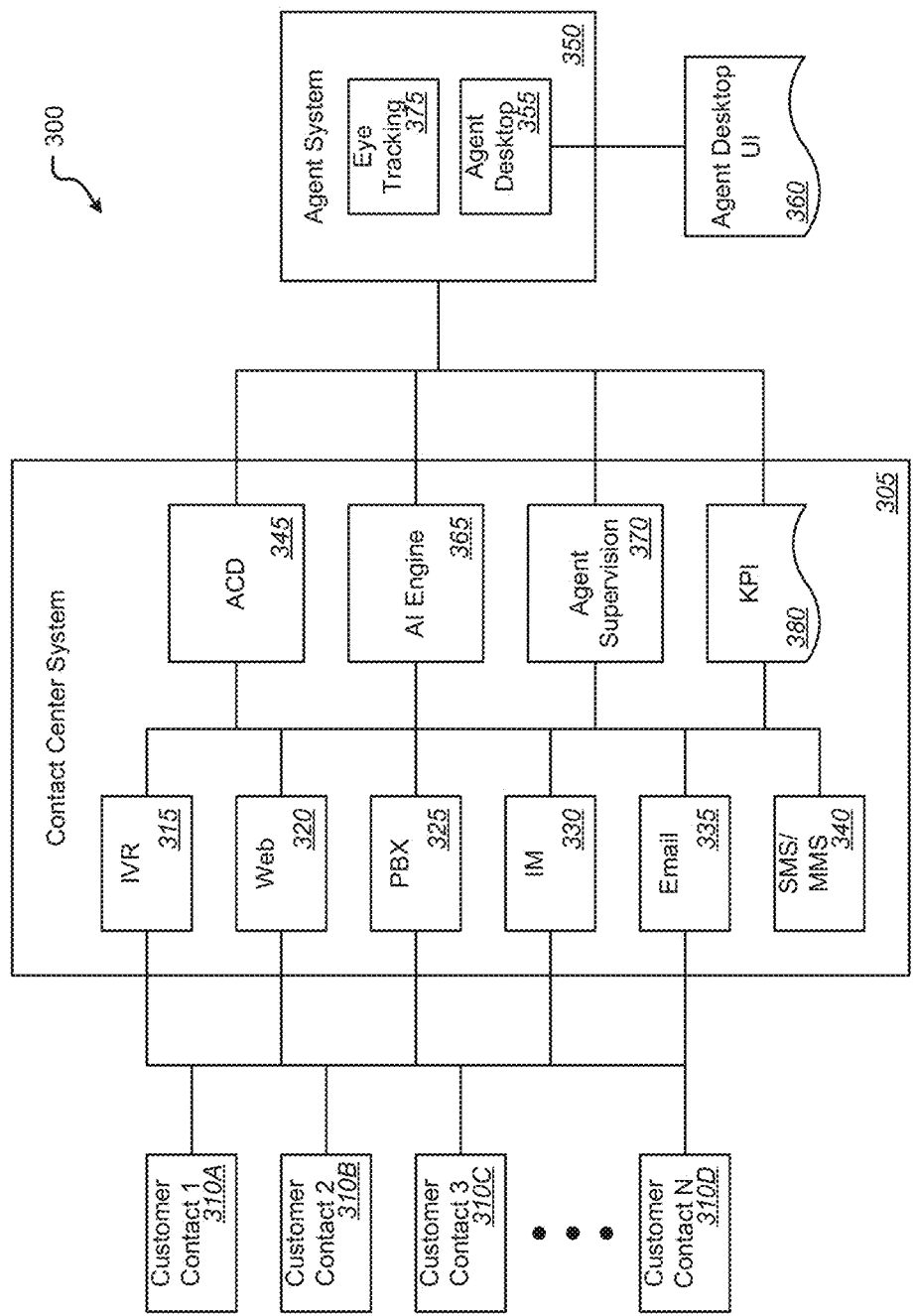
FIG. 3 is a block diagram illustrating elements of an exemplary contact center in which embodiments of the present disclosure may be implemented.

FIG. 3 is a block diagram illustrating elements of an exemplary contact center in which embodiments of the present disclosure may be implemented. As illustrated in this example, the system 300 can include a contact center system 305 comprising one or more servers and/or other computers as described above. The system 300 can also include one or more customer contacts 310A-310D. These customer contacts 310A-310D can comprise, for example, any of a variety of computing devices as described above or as known in the art including but not limited to a desktop or laptop computer, a tablet, cellphone, or other mobile device, a telephone, etc. The customer contact devices 310A-310D can communicate with the contact center system 305 over one or more wired or wireless networks (not shown here) such as the Internet or other local or wide area networks as described above.

Generally speaking, the contact center system 305 can include a number of different communications modules or subsystems for establishing and conducting communication sessions with the customer contact devices 310A-310D. For example, the communications modules or subsystems can include, but are not limited to, an Interactive Voice Response (IVR) system 315, a web service or system 320, a Private Branch eXchange (PBX) system 325, an Instant Messaging (IM) system 330, an email system 335, a Short Message Service (SMS) and/or Multimedia Message Service (MIMS) text messaging system 340, etc. Though these various systems, a communication session can be established between the customer contact devices 310A-310D and the contact center system 305. For example, a customer contact device 310A can send an IM message or SMS message requesting information about a particular product or to request help troubleshooting a problem with that product. Similarly, a customer contact device 310B can access a customer service web page provided by the web service or system 320 of the contact center system 305 to complete a form or otherwise request information or assistance.

Regardless of the type of message or communication channel used, a communication session can be established between the customer contact device 310A and the contact center system 305. The contact center system 305 can also include an Automatic Call Distribution (ACD) module or system 345 as known in the art. Generally speaking, the ACD module or system 345 can analyze the messages received through the communication sessions established with the customer contact devices 310A-310D and, if a human agent is needed to assist the customer in the communication session, can select the human agent to assist in the session from a set of available agents. As known in the art, this selection can be based on the topic of the communication session, the skills and/or knowledge of the agent, the current workload of the agent, etc.

Once an agent has been selected, an agent system 350 associated with that selected, human agent can be joined to the communication session with the customer contact device 310A by the contact center system 305. The agent system 350 can comprise a computer, workstation, or other computing device such as described above. The agent system 350 can execute an agent desktop application 355 which presents, e.g., through a display device of the agent system 350, an agent desktop user interface 360. Through the agent desktop application 355 and agent desktop user interface 360, the human agent can read messages sent from the customer contact device 310A, enter messages to the customer contact device 310A, conduct audio and/or video conferences with the customer contact device 310A, and otherwise participate in the communication session to assist the customer. In some cases, such as a voice call or video conference, the agent system 350 may be added to a communication session with a single customer contact device 310A. In other cases, the agent system 350 may be added to a communication session with more than one customer contact device 310A-310D at a time. For example, a human agent is capable of reading and responding to multiple ongoing IM chat sessions concurrently. Similarly, the human agent can read and respond to multiple concurrent email and/or text message sessions or some combination of IM, email, text, or other sessions.

The contact center system 305 can also include one or more Artificial Intelligence (AI) modules or systems 365. Generally speaking, the AI modules or systems can comprise one or more applications able to conduct a conversation with a human contact via voice or text-based communication such as an email, SMS or MMS text, IM, etc. In many cases, the AI modules or systems 365 can handle an initial portion of a contact session with a customer to, for example, determine a reason or topic for the contact so that the contact can be properly routed to a human agent to handle the contact. In other cases, the AI modules or systems 365 can provide sufficient information or resolution to the customer without involving a human agent. In many cases, AI-generated content segments can be distributed throughout a communication session and not just at the initial entry point for the customer. Thus, a chat or other communication session might consist of a blending of human agent-generated content and AI-generated content, depending on the context of the communication session.

A chatbot is one example of where artificial intelligence may be used to assist an agent in generating textual content for a number of active chat sessions that are being serviced by the agent. A chatbot implemented as or with the AI engine 365 as known in the art can generate useful content at various stages of a chat session, not just at the beginning of the session, between a customer contact and the human agent. This AI generated content can reduce the amount of time the human agent has to spend on each chat session. This in turn can enable the human agent to handle more chat sessions at the same time, when compared to the case where there is no chatbot assistance. Therefore, the chat session capacity per agent is proportional to the increase in chatbot assistance, so as artificial intelligence technology evolves in the future, so too will the capacity of a single agent.

Since a chat or other communication session can consist of a combination of interspersed human agent generated content and AI-generated content, the segments of AI-generated content can be tagged so that these can be distinguished from the content which was created by the agent. As the AI engine 365 is increasingly involved in the session, there is a risk that the human agent may not apply sufficient oversight and due diligence to the AI-generated content, which could result in a negative experience for a customer. For example, if a customer is receiving slightly illogical or confusing content from the chat session, they will perceive that it's a machine interaction and may drop the session. Therefore, the AI-generated content can be presented to the human agent through the agent desktop user interface 360 for review and approval or modification by the human agent before it is provided to the customer contact device 310A.

According to one embodiment, eye tracking technology can be used to analyze the eye movements of the human agent in relation to AI-generated content presented on the agent desktop user interface 360. In this way, review of the AI-generated content by the human agent can be monitored to determine whether the appropriate level of attention of agent oversight is being applied to the AI-generated content to avoid the customer losing the perception of a human interaction or otherwise becoming frustrated with incorrect or inaccurate content. More specifically, the agent system 350 can include or be connected with an eye tracking module or system 375 which detects and monitors the eye position or "gaze" of the human agent while the AI-generated content is being displayed on the agent desktop user interface.

As known in the art, eye tracking is the process of measuring the point of gaze (where one is looking) and/or the motion of an eye relative to the head or relative to a scene being viewed such as a user interface display. An eye tracker, such as the eye tracking module or system 375 is a device for measuring eye positions and eye movement. Eye trackers are commonly used in research on the visual system, in psychology, in psycholinguistics, marketing, as an input device for human-computer interaction, in product design, and in a number of other fields and applications. The most widely used current designs for eye tracking systems are video-based eye trackers in which a camera focuses on one or both eyes of an individual or viewer and records the eye movement as the viewer looks at some kind of scene or stimulus. Most eye-tracker systems use the center of the pupil and infrared or near-infrared non-collimated light to create corneal reflections (CR) from the surface of the eye(s). The vector between the pupil center and the corneal reflections can be used to compute the point of regard or the gaze direction on the scene or stimulus.

As also known in the art, eye movements detected in this way can be divided into fixations when the eye gaze pauses in a certain position and saccades when the eye moves to another position. The resulting series of fixations and saccades is called a scanpath. Smooth pursuit describes the eye following a moving object. Fixational eye movements include microsaccades, which are small, involuntary saccades that occur during attempted fixation. Most information from the eye is made available during a fixation or smooth pursuit, but not during a saccade. The locations of fixations or smooth pursuit along a scanpath show what information loci on the stimulus were processed during an eye tracking session. The duration of fixations, microsaccades, and saccades can be used to determine whether the viewer is reading linguistic text, viewing a scene or portion of a scene, moving towards a new scene or portion of a scene, etc.

To allow interpretation of the data that is recorded by the eye tracking module or system 375 the eye movement of the human agent or viewer can be graphically or quantitatively represented. For example, heat maps, blind zone maps, scanpaths and other representations can be generated from monitoring the movement of the human agent's eye across the agent desktop user interface 360 can be analyzed to determine where the agent was looking, whether the agent was reading AI-generated text or other content, for how long, etc. As known in the art, a heat map is a graphical representation of the detected viewers gaze and eye movement in which "hot zones" or zones with higher density designate where the user focused his gaze with a higher frequency or for a longer duration. A blind zone map is a version of a heat map where the visually less attended zones are displayed clearly or highlighted to illustrate which zones or locations of the scene or UI are not being viewed by the user. Scanpaths are graphical representations of the fixations and saccades across the scene or UI. Other types of graphical or quantitative representations of the human agent's view of the agent desktop user interface 360 as known in the art can be generated by the eye tracking module or system 375 and are considered to be within the scope of the present invention.

Based on this monitoring of the eye movements of the human agent and the generated representation(s) thereof, metadata or other information can be generated by the eye tracking module or system 375 indicating the level of attention of the human agent to the AI-generated content. According to one embodiment, this metadata can be added to a record of the communication session. In this way, a record of the communication session can comprise a recording of the content with indications of which content is human agent generated and which is AI-generated, for example, using color coding or other means to differentiate the content. The record of the session can also contain the generated metadata that describes the agent's physical reviewing of the content, when it was reviewed, how much time was spent reviewing it, etc.

According to one embodiment, such metadata can be then rolled up into or used to generate a higher-level Key Performance Indicator (KPI) 380 for content oversight which can be in turn compared with an expected value. For example, agents with a low oversight KPI based on this comparison may not be applying sufficient oversight to the AI-generated content. Conversely, agents with an oversight KPI 380 that is too high may be spending too much time reviewing the AI-generated content, hence negating the advantages of having AI assistance.

According to one embodiment, this expected or optimal level of attention that the human agent is compared against can be generated based on the AI-content itself by the AI engine 365. For example, and as known in the art, the AI engine 365 can generate a Turing Risk factor or other relevance score along with the content and indicating a level of confidence that the generated content is relevant to the question being asked and/or the context of the communication session. Thus, if the AI engine 365 is somewhat unsure of the relevance of a specific piece of content, it may rate that content with a confidence level indicating the risk that this particular piece of content may cause the customer to suspect they are interacting with a machine. In some cases, this confidence level or risk factor can be visible to the agent, perhaps through a simple background color coding arrangement on the presented content. In such cases, a higher risk factor or lower confidence score may indicate and correspond to a greater level of attention by the agent, i.e., the agent should spend a more time reviewing that particular content. Conversely, content with a low risk score or high level of confidence may have a lower expected level of attention against which the agent will be measured.

Stated another way, monitoring of agent oversight of automatically generated content in a contact center 305 can comprise conducting, by one or more communication modules 315-340 of the contact center 305 over one or more communication channels, a communication session with each of a plurality of client devices 310A-310D. Each client device 310A-310D can be associated with a customer contact. For example, the communication sessions can comprise one or more of a chat session, a Short Message Service (SMS) exchange, and email exchange, or another text-based exchange between the customer contacts and the human agent.

Content for each communication session can be generated by an artificial intelligence engine 365 of the contact center 305. For example, a chatbot or other artificial intelligence system as described above can read and analyze messages from a customer contact and generate an answer to that message. Generating the content for each communication session can further comprise generating a level of confidence for the generated content. That is, the chatbot or other artificial intelligence system can generate a confidence score, probability, or other indication of the likelihood that the generated content is correct and appropriate for the customer contact message.

The content generated by the artificial intelligence engine 365 for each session can be provided to an agent device 350 associated with a human agent prior to providing the generated content to any of the client devices 310A-310D. The provided content can be presented to the human agent through a user interface 360 provided by the agent device 350. That is, the content generated by the artificial intelligence engine 365 can be presented or displayed on the agent's user interface 360 for review and approval by the agent before it is sent to the customer contact. In some cases, where a confidence level is available from the artificial intelligence engine 365, an indication of the generated level of confidence for the content can also be presented to the agent through the user interface along with the generated content. In this way, content having a low level of confidence can be identified as needing more careful review while content with a high confidence level can be identified as needed less careful review.

An eye tracking system 375 associated with the agent device 350 can monitor review of the generated content by the human agent while the generated content is presented through the user interface 360 provided by the agent device 350. That is, while the content is displayed in the agent's user interface 360, the eye tracking system 375 can monitor the agent's gaze position on the content, eye movement across the interface 360, etc. and determine which content the agent is viewing, whether he is actively reading that content, for how long, etc.

Based on these factors, the eye tracking system 375 can generate an indication of the human agent's level of attention to the generated content. This indication can comprise an indication of a level relative to a predetermined expected level of attention, i.e., greater than, approximately equal to, or less than the expected or ideal level of attention. In some cases, the predetermined expected level of attention can be based on the generated level of confidence for the generated content. That is, content with a high level of confidence may be expected to be reviewed for a shorter time or even not at all while content with a low level of confidence can be given a longer or higher expected level of attention.

The generated indication of the human agent's level of attention is stored in a set of KPIs 380 for the human agent. That is, the KPI 380 metadata can be expanded to include one or more indicators of the agent's level of attention to automatically generated content. This metadata can be used to generate one or more reports, provide alerts to the agent or the agent's supervisor when outside of certain ranges, provide dashboard indicators of agent performance, etc.

Figure 4:
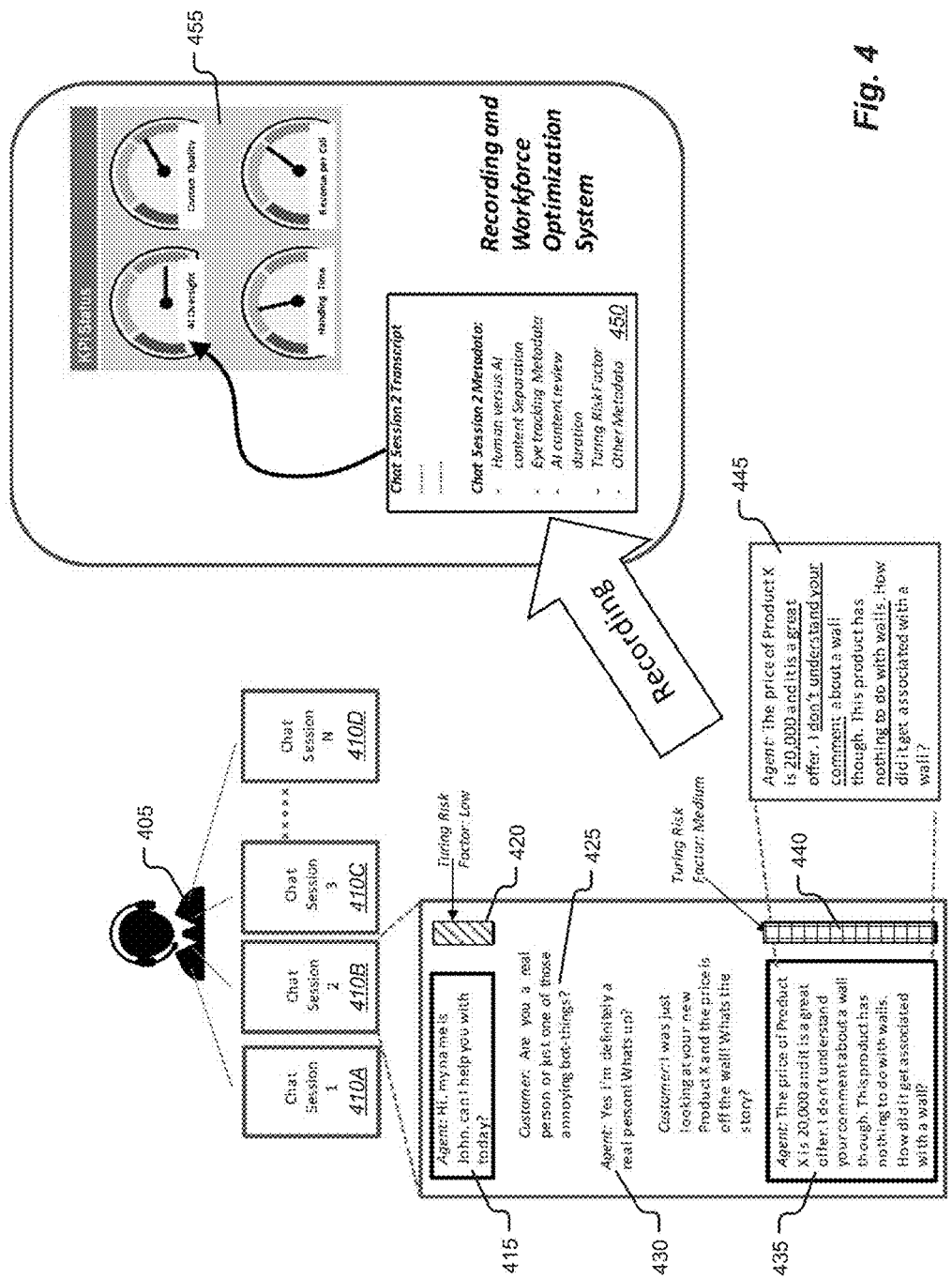
FIG. 4 is a block diagram illustrating monitoring of agent oversight of artificial intelligence content in a contact center according to one embodiment.

FIG. 4 is a block diagram illustrating monitoring of agent oversight of artificial intelligence content in a contact center according to one embodiment. As illustrated in this example, a human agent 405 can conduct a number of simultaneous or concurrent communication sessions 410A-410D such as chat sessions with customer contacts as described above. In one example of such a session 410B, text 415 can be generated by the AI engine 365 as described above as part of the dialog with the customer contact. Prior to this text being sent to the customer contact, it can be presented to the human agent 405 for review. An indication 420 of a confidence level or risk factor for this content, e.g., a Turing risk factor, can also be provided. This indication can comprise, for example, a flag, marker, underlining, highlighting, text font, size, color, etc., an icon, or any other graphical or textual indication in the user interface to indicate the relative risk or confidence associated with the generated content. For example, an indicator for AI-generated content with a low risk or high confidence level may be green while other indicators may be yellow and red to indicate increasing levels or risk or decreasing levels of confidence.

Once the human agent 405 has reviewed and approved this content 415, it can be sent to the customer contact and a reply 425 can be received and presented to the agent 405. As illustrated in this example, the agent 405 may generate and send a response 430 and continue the dialog. As the dialog continues, additional AI-generated content 435 may be presented for review by the agent 405. Again, an indicator 440 of a confidence level or risk factor for this content, e.g., a Turing risk factor, can also be provided.

As described in detail above, the eye tracking system 375 can generate one or more graphical or quantitative representations 445 of the agent's 405 review of the AI-generated content 415 and 435 based on monitoring and tracking the agent's eyes. For example, heat maps, blind zone maps, scanpaths and other representations can be generated from monitoring the movement of the human agent's eye across the agent desktop user interface and can be analyzed to determine where the agent was looking, whether the agent was reading the AI-generated text 415 and 435 or other content, for how long, etc.

As also described above, the communication session and/or various aspects thereof can be monitored and recorded. For example, metadata 450 or other information can be generated by the eye tracking module or system 375 indicating the level of attention of the human agent to the AI-generated content. According to one embodiment, this metadata 450 can be added to a record of the communication session and/or recorded as one or more KPIs. This metadata can include, but is not limited to, information indicating human-generated content versus AI-generated content in the communication session, various eye tracking metrics, AI-generated content review duration, Turing risk factors or other indications of risk or confidence for AI-generated content, etc.

Using this recorded metadata 450, a dashboard 455 or other representation of agent performance can be generated and presented to the agent and/or the agent's supervisor. This presentation 455 can take any of a variety of forms. For example, the presentation can comprise a set of gages or other graphics representing the agent's performance for various metrics. One such metric represented can be an AI-content review metric indicating the agent's level of attention relative to the expected level of attention, e.g., based on the risk or confidence level determined and indicated for each piece of AI-generated content. It should be understood that the exact representation can vary significantly depending upon the exact implementation without departing from the scope of the present disclosure.

Figure 5:
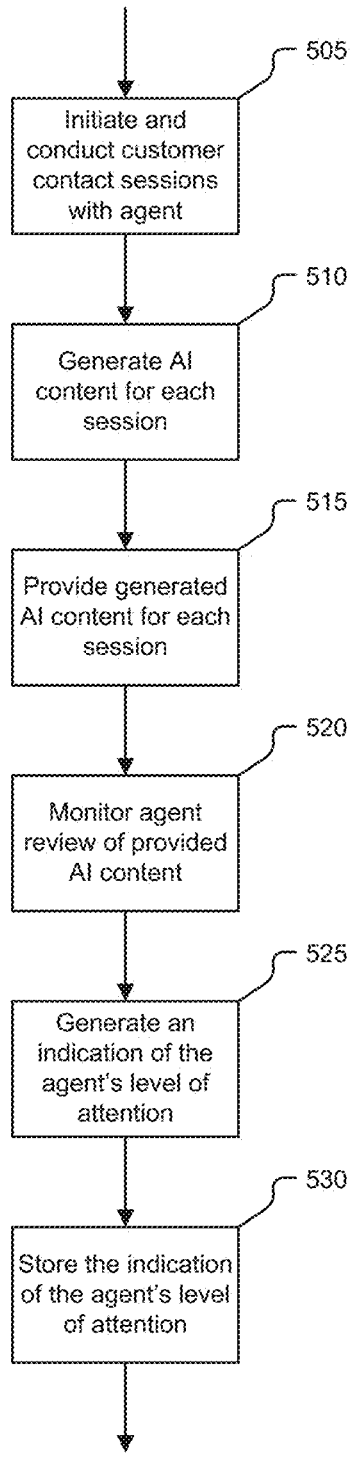
FIG. 5 is a flowchart illustrating an exemplary process for monitoring of agent oversight of artificial intelligence content in a contact center according to one embodiment.

FIG. 5 is a flowchart illustrating an exemplary process for monitoring of agent oversight of artificial intelligence content in a contact center according to one embodiment. As illustrated in this example, monitoring of agent oversight of automatically generated content in a contact center can comprise conducting 505, by one or more communication modules of the contact center over one or more communication channels, a communication session with each of a plurality of client devices. Each client device can be associated with a customer contact. For example, the communication sessions can comprise one or more of a chat session, a Short Message Service (SMS) exchange, and email exchange, or another text-based exchange between the customer contacts and the human agent.

Content for each communication session can be generated 510 by an artificial intelligence engine of the contact center. For example, a chatbot or other artificial intelligence system as described above can read and analyze messages from a customer contact and generate an answer to that message. Generating 510 the content for each communication session can further comprise generating a level of confidence for the generated content. That is, the chatbot or other artificial intelligence system can generate a confidence score, probability, or other indication of the likelihood that the generated content is correct and appropriate for the customer contact message.

The content generated 510 by the artificial intelligence engine for each session can be provided 515 to an agent device associated with a human agent prior to providing the generated content to any of the client devices. The provided 515 content can be presented to the human agent through a user interface provided by the agent device. That is, the content generated 510 by the artificial intelligence engine can be presented or displayed on the agent's user interface for review and approval by the agent before it is sent to the customer contact. In some cases, where a confidence level is available from the artificial intelligence engine, an indication of the generated level of confidence for the content can also be presented to the agent through the user interface along with the generated content. In this way, content having a low level of confidence can be identified as needing more careful review while content with a high confidence level can be identified as needing less careful review.

An eye tracking system associated with the agent device can monitor 520 review of the generated content by the human agent while the generated content is presented through the user interface provided by the agent device. That is, while the content is displayed in the agent's user interface, the eye tracking system can monitor 520 the agent's gaze position on the content, eye movement across the interface, etc. and determine which content the agent is viewing, whether he is actively reading that content, for how long, etc.

Based on these factors, the eye tracking system can generate 525 an indication of the human agent's level of attention to the generated content. This indication can comprise an indication of a level relative to a predetermined expected level of attention, i.e., greater than, approximately equal to, or less than the expected or ideal level of attention. In some cases, the predetermined expected level of attention can be based on the generated level of confidence for the generated content. That is, content with a high level of confidence may be expected to be reviewed for a shorter time or even not at all while content with a low level of confidence can be given a longer or higher expected level of attention.

The generated indication of the human agent's level of attention storing 530 in a set of Key Performance Indicators (KPIs) for the human agent. That is, the KPI metadata can be expanded to include one or more indicators of the agent's level of attention to automatically generated content. This metadata can be used to generate one or more reports, provide alerts to the agent or the agent's supervisor when outside of certain ranges, provide dashboard indicators of agent performance, etc.

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for monitoring of agent oversight of automatically generated content in a contact center, the method comprising:
    conducting, by one or more communication modules of the contact center over one or more communication channels, a communication session with each of a plurality of client devices, each client device associated with a customer contact;
    generating, by an Artificial Intelligence (AI) engine of the contact center, AI-generated content for each communication session;
    providing, by the AI engine, the AI-generated content for each communication session to an agent device associated with a human agent prior to providing the generated content to any of the client devices, wherein the provided, AI-generated content is presented to the human agent through a user interface provided by the agent device;
    monitoring, by an eye tracking system associated with the agent device, review of the AI-generated content by the human agent while the AI-generated content is presented through the user interface provided by the agent device; and
    generating, by the eye tracking system associated with the agent device, an indication of the human agent's level of attention to the AI-generated content based on monitoring the review of the generated content by the human agent.

2. The method of claim 1, further comprising storing the generated indication of the human agent's level of attention in a set of Key Performance Indicators (KPIs) for the human agent.

3. The method 2, further comprising providing one or more reports based on the KPIs.

4. The method of claim 1, wherein the communication sessions with the plurality of customer contacts comprise one or more of a chat session, a Short Message Service (SMS) exchange, and email exchange, or another text-based exchange between the customer contacts and the human agent.

5. The method of claim 1, wherein the generated indication of the human agent's level of attention is relative to a predetermined expected level of attention.

6. The method of claim 5, wherein generating the content for each communication session further comprises generating a level of confidence for the AI-generated content.

7. The method of claim 6, wherein the predetermined expected level of attention is based on the generated level of confidence for the AI-generated content.

8. The method of claim 6, further comprising providing an indication of the generated level of confidence for the AI-generated content through the user interface provided by the agent device and along with the AI-generated content.

9. A system comprising:
    a processor; and
    a memory coupled with and readable by the processor and storing therein a set of instructions which, when executed by the processor, causes the processor to monitor agent oversight of automatically generated content in a contact center by:
        conducting, by one or more communication modules of the contact center over one or more communication channels, a communication session with each of a plurality of client devices, each client device associated with a customer contact;
        generating, by an Artificial Intelligence (AI) engine of the contact center, AI-generated content for each communication session;
        providing, by the AI engine, the AI-generated content for each communication session to an agent device associated with a human agent prior to providing the AI-generated content to any of the client devices, wherein the provided, AI-generated content is presented to the human agent through a user interface provided by the agent device;
        monitoring, by an eye tracking system associated with the agent device, review of the AI-generated content by the human agent while the AI-generated content is presented through the user interface provided by the agent device; and
        generating, by the eye tracking system associated with the agent device, an indication of the human agent's level of attention to the AI-generated content based on monitoring the review of the AI-generated content by the human agent.

10. The system of claim 9, further comprising storing the generated indication of the human agent's level of attention in a set of Key Performance Indicators (KPIs) for the human agent and providing one or more reports based on the KPIs.

11. The system of claim 9, wherein the communication sessions with the plurality of customer contacts comprise one or more of a chat session, a Short Message Service (SMS) exchange, and email exchange, or another text-based exchange between the customer contacts and the human agent.

12. The system of claim 9, wherein the generated indication of the human agent's level of attention is relative to a predetermined expected level of attention and wherein generating the content for each communication session further comprises generating a level of confidence for the AI-generated content.

13. The system of claim 12, wherein the predetermined expected level of attention is based on the generated level of confidence for the AI-generated content.

14. The system of claim 12, further comprising providing an indication of the generated level of confidence for the AI-generated content through the user interface provided by the agent device and along with the generated content.

15. A non-transitory computer-readable medium comprising a set of instructions stored therein which, when executed by a processor, causes the processor to monitor agent oversight of automatically generated content in a contact center by:
conducting, by one or more communication modules of the contact center over one or more communication channels, a communication session with each of a plurality of client devices, each client device associated with a customer contact;
generating, by an Artificial Intelligence (AI) engine of the contact center, AI-generated content for each communication session;
providing, by the AI engine, the AI-generated content for each communication session to an agent device associated with a human agent prior to providing the AI-generated content to any of the client devices, wherein the provided, AI-generated content is presented to the human agent through a user interface provided by the agent device;
monitoring, by an eye tracking system associated with the agent device, review of the AI-generated content by the human agent while the AI-generated content is presented through the user interface provided by the agent device; and
generating, by the eye tracking system associated with the agent device, an indication of the human agent's level of attention to the AI-generated content based on monitoring the review of the AI-generated content by the human agent.

16. The non-transitory computer-readable medium of claim 15, further comprising storing the generated indication of the human agent's level of attention in a set of Key Performance Indicators (KPIs) for the human agent and providing one or more reports based on the KPIs.

17. The non-transitory computer-readable medium of claim 15, wherein the communication sessions with the plurality of customer contacts comprise one or more of a chat session, a Short Message Service (SMS) exchange, and email exchange, or another text-based exchange between the customer contacts and the human agent.

18. The non-transitory computer-readable medium of claim 16, wherein the generated indication of the human agent's level of attention is relative to a predetermined expected level of attention and wherein generating the content for each communication session further comprises generating a level of confidence for the AI-generated content.

19. The non-transitory computer-readable medium of claim 18, wherein the predetermined expected level of attention is based on the generated level of confidence for the AI-generated content.

20. The non-transitory computer-readable medium of claim 18, further comprising providing an indication of the generated level of confidence for the AI-generated content through the user interface provided by the agent device and along with the AI-generated content.

* * * * *